Aug. 29, 1933. H. E. FIGGIE 1,924,600

BUMPER END CONSTRUCTION

Filed May 7, 1931

INVENTOR
Harry E. Figgie
By Green & McCallister
His Attorneys

Patented Aug. 29, 1933

1,924,600

UNITED STATES PATENT OFFICE 1,924,600

BUMPER END CONSTRUCTION

Harry E. Figgie, Lakewood, Ohio, assignor to Standard Steel Spring Company, a corporation of Pennsylvania Application May 7, 1931. Serial No. 535,629

9 Claims. (Cl. 293—55)

This invention relates to a bumper construction and more specifically to the construction and arrangement of the pivotally connected ends of bumper bars of the single front or impact bar type.

The disadvantages of present day bumper constructions are too well known to require detailed discussion. It is known, for example, that such bumper constructions are not protected from rain and dirt which quickly reduce the efficiency and life of the bumper construction.

One of the objects of the present invention is to provide a bumper construction which is simple to make and assemble and which is long lived and efficient throughout its life.

Another object is to provide a bumper end construction which is closed against access of rain and dirt and the like insofar as is possible and which will at the same time yield a construction having a better appearance and a higher efficiency.

A further object is to provide a front bar with a barrel-shaped terminal within which, via a suitable slot, the rear bar is pivoted in operative assembly.

Other and more specific objects and advantages will either be understood from the following specification or will be apparent to those skilled in this art.

In the accompanying drawing, I have illustrated two embodiments of my invention and in said drawing.

Similar numerals designate corresponding parts in the several views.

Figure 1:
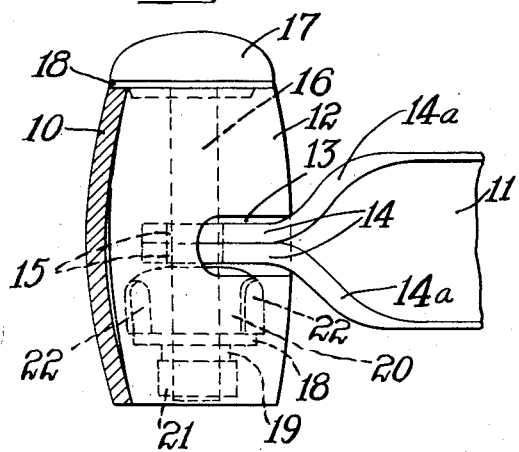
Figure 1 is an elevation of one form of the present invention.
Figure 2:
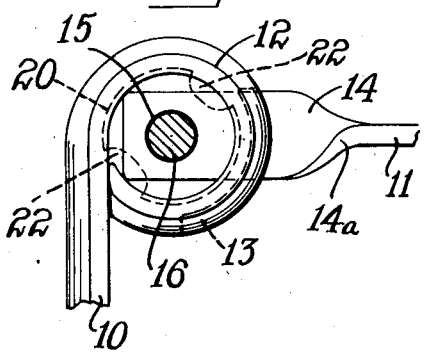
Fig. 2 is a plan view of the construction of Fig. 1 with certain portions omitted.

Referring first to Figs. 1 and 2 there is shown a front bumper bar 10 and a rear bumper bar 11, the front bumper bar being wider than the rear bar and the construction being particularly adapted for the so-called single bar type. Front or impact bar 10 has its end coiled around rearwardly to form a terminal portion 12 which is barrel-shaped due to the fact that the impact bar has an arcuate or curved cross section; namely, a concavo-convex section as is apparent from Fig. 1. The extreme end of the bar is bent around into substantial contact with the rear concave surface of the impact bar, thus providing a construction which is closed all around its sides very substantially.

A slot 13 is provided in said barrel-shaped terminal about centrally of the height thereof and disposed horizontally and of any desired length and/or height. The particular dimensions of the slot will depend upon various factors which are understood by those in this field, such as resultant required rigidity and also the size of the rear bar, due regard being had to the materials and to the conditions to be met in use. If so desired this slot may even extend entirely to the edge of the bar which contacts with the concave rear surface of the impact bar.

The rear bar 11 is of suitable height and thickness and in the particular modification shown the extreme end of the bar is folded to form the abutting portions 14 which are, in effect, at a 90° angle to the main portion of the rear bar. Suitable holes 15 are punched or otherwise cut through said folded portions so that the rear bar may be connected as now to be described. The metal flares as indicated form portions 14 to the rear bar proper forming intermediate shoulders 14a.

The folded terminal of the rear bar passes through the slot 13 in the barrel-shaped terminal 12 of the front or impact bar and within the same is pivotally secured by means of a bolt member 16 which passes vertically through the barrel-shaped terminal 12. This bolt is provided with an enlarged head 17 which rests upon the flanges of washer 18, as shown, thereby forming a closed top portion which may be also suitably ornamental to add to the attractiveness of the construction. Bolt 16 is threaded at its lower end for the reception of washer 18 and lock washer 19, which are used to hold the bearing or washer member 20 in position with the aid of a nut 21. The member 20 may be of any suitable or desired construction such as a concavo-convex disk having cut out portions 22 to yield some flexibility in the construction so that nut 21 may be tightened as much as possible or desired without making too rigid a construction.

Figure 3:
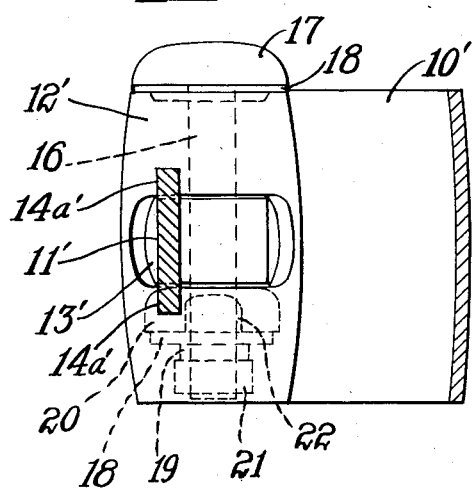
Fig. 3 is a view similar to Fig. 1 of a modified form of the invention.
Figure 4:
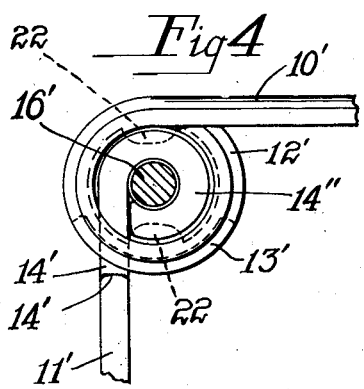
Fig. 4 is a view similar to Fig. 2 of the modification of Fig. 3.

Referring to Figs. 3 and 4 front or impact bar 10′ is the same as that 10 of Fig. 1 and barrel-shaped portion 12′ is the same as portion 12 of the same figure. The differences between the modification of Figs. 3 and 4 and that of Figs. 1 and 2 are particularly apparent in connection with the rear bar 11′. This bar is provided with a reduced portion 14′ which is bent around in a direction opposite to the corresponding portion of the front bar to form a terminal cylinder 14" as is apparent, but it is to be understood that if the rear bar is not wider than the height of the slot no such reduced portion would be necessary. In the form shown, however, there is such a reduced portion and also shoulders 14a' analogous to the portions 14 and 14a of bar 11 of Fig. 1, with the distinction being noted that the reductions are accomplished in a somewhat different manner. Slot 13' in barrel-shaped portion 12' is wider than that shown in Fig. 1 but this is a matter of conforming the construction to the sizes of the bars used in the particular embodiment. In other respects, the construction of Figs. 3 and 4 is similar to that of Figs. 1 and 2 and the identical means is used for assembling the bar ends in operative assembly. In this modification also, I may if I so desire extend the slot to the edge of the bar which contacts with the rear concave surface of the impact bar 10'.

It is clear from the foregoing that I have provided an extremely simple bumper end construction which is at the same time proportionately strong and efficient and which provides maximum protection against the elements thereby preventing reduction of efficiency. In practice, the slots define the limits of movement of the rear bar and guide such movement which takes place upon impact or upon the existence of other than normal conditions.

It is clear that I am not limited to a concavo-convex impact bar but other suitable configurations are equally well adapted to the invention; nor am I limited to the particular size and relationship of the slots shown as such would, of course, be changed to meet varying conditions to be met and to enable the use of the present invention with all sizes and shapes of front and rear bars. Such will be understood by those skilled in the art from the preceding description.

While I have described and illustrated for each modification only one end construction, it is to be understood that the other end construction is identical therewith, except insofar as it is essentially of opposite "hand".

What I claim as new and desire to secure by Letters Patent is:

1. In a bumper construction, an impact bar having an end bent around into a hollow, substantially closed terminal, said terminal having a slot through one wall thereof, a rear bar having an end passing through said slot into the interior of said terminal, and means for pivotally connecting the indicated members in operative assembly, said means terminating within said terminal which, accordingly, covers and protects the same.

2. In a bumper construction, an impact bar having an end bent around into a hollow, substantially closed terminal, said terminal having a slot through one wall thereof, a rear bar having an end passing through said slot into the interior of said terminal, and means for pivotally connecting the indicated members in operative assembly, said slot being narrower than the height of said rear bar, the end of which is accordingly configured to enable it to pass through the slot, and the terminal being so constructed as to receive the lower end of said pivotal connecting means therewithin.

3. Bumper structure comprising an impact-receiving bar having a cylindrical eye formed in one of its ends, the eye being cut away to form a transversely-extending slot through one wall thereof, a back bar having a flattened end extending through said slot, and means for securing the said bars together.

4. Bumper structure comprising an impact-receiving bar having a cylindrical eye formed in one of its ends, the eye being cut away to form a transversely-extending slot through one wall thereof, and a back bar of substantially flat material having an end twisted to a plane substantially at right angles to the remainder of said bar and extending into the said slot, and means for securing the said bars together.

5. Bumper structure comprising an impact-receiving bar and a back bar, one of said bars having an end provided with a horizontally-slotted eye, and the adjacent end of the other bar extending through the said slot and into the interior of said first bar end, and means for securing the bars together, said means terminating within and being enclosed by said dotted end which is of a size to receive the same.

6. Bumper structure comprising an impact-receiving bar having a cylindrical eye formed in one of its ends, the eye being cut away to form a transversely-extending slot through one wall thereof, a back bar having a flattened end with an eye therein extending through said slot, and means comprising a bolt of shorter length than the said cylindrical eye for securing the said eyes together.

7. Bumper structure comprising an impact-receiving bar having a cylindrical eye formed in one of its ends, the eye being cut away to form a transversely-extending slot through one wall thereof, a back bar having a flattened end with an eye therein extending through said slot, and means comprising a bolt of shorter length than the said cylindrical eye for securing the said eyes together, the head of the bolt engaging the upper end of the first-named eye, and the shank of the bolt terminating at a point below the second-named eye.

8. In a bumper end construction, an impact bar, an eye at the end of said impact bar, a cut-out portion forming a slot and a shoulder on the inner side of said eye, a rear bar having an end portion twisted through an angle of approximately 90°, the twisted portion of said rear bar extending through the slot in said eye, said end portion having a hole therein, a bolt shorter than said eye and having a head engaging and closing the upper end of said eye, said bolt extending through the hole in said rear bar, a nut on said bolt, said nut and bolt cooperating to clamp said bars and the head of the bolt in position.

9. In a bumper construction, an impact bar having an end bent around into contact with itself to form a substantially closed cylindrical terminal having a slot through one wall thereof, a rear bar of greater vertical height than said slot but having an apertured end reduced and passing through said slot into the interior of said terminal, a bolt having a head about the diameter of said terminal and a shank extending nearly through said terminal and through the apertured end of said rear bar, terminating, however, within said terminal and provided with suitable positioning and fastening means also lying within said terminal.

HARRY E. FIGGIE.